United States Patent [19]

Landa

[11] 4,355,883
[45] Oct. 26, 1982

[54] PHOTOCOPIER SCANNING APPARATUS

[75] Inventor: Benzion Landa, Edmonton, Canada

[73] Assignee: Savin Corporation, Valhalla, N.Y.

[21] Appl. No.: 85,109

[22] Filed: Oct. 15, 1979

[51] Int. Cl.³ ............................................. G03G 15/28
[52] U.S. Cl. .......................................... 355/8; 355/57; 355/60; 355/66; 355/11
[58] Field of Search ...................... 355/8, 3 R, 66, 57, 355/60, 11

[56] References Cited

U.S. PATENT DOCUMENTS

| 3,652,156 | 3/1972 | Lahr et al. | 355/8 |
| 3,918,806 | 11/1975 | Cook | 355/8 |
| 3,920,326 | 11/1975 | Hirth | 355/8 |
| 4,023,897 | 5/1977 | Clark | 355/8 |
| 4,073,584 | 2/1978 | Kitajima | 355/8 |
| 4,161,359 | 7/1979 | Masham | 355/8 |

Primary Examiner—R. L. Moses
Attorney, Agent, or Firm—Shenier & O'Connor

[57] ABSTRACT

Photocopier scanning apparatus wherein a scanning carriage is mechanically driven by a pair of flexible cables acting on the carriage at widely spaced points on either side of its center of gravity. The cables may be electrically conductive to energize an illuminating lamp mounted on the carriage. The carriage rests on glass slides having arcuate surface portions and is further urged thereagainst by forces from permanent magnets. The carriage is resiliently biased to return to an initial position. The velocity with which the carriage returns is limited; and the return velocity is further damped adjacent the initial position.

16 Claims, 5 Drawing Figures

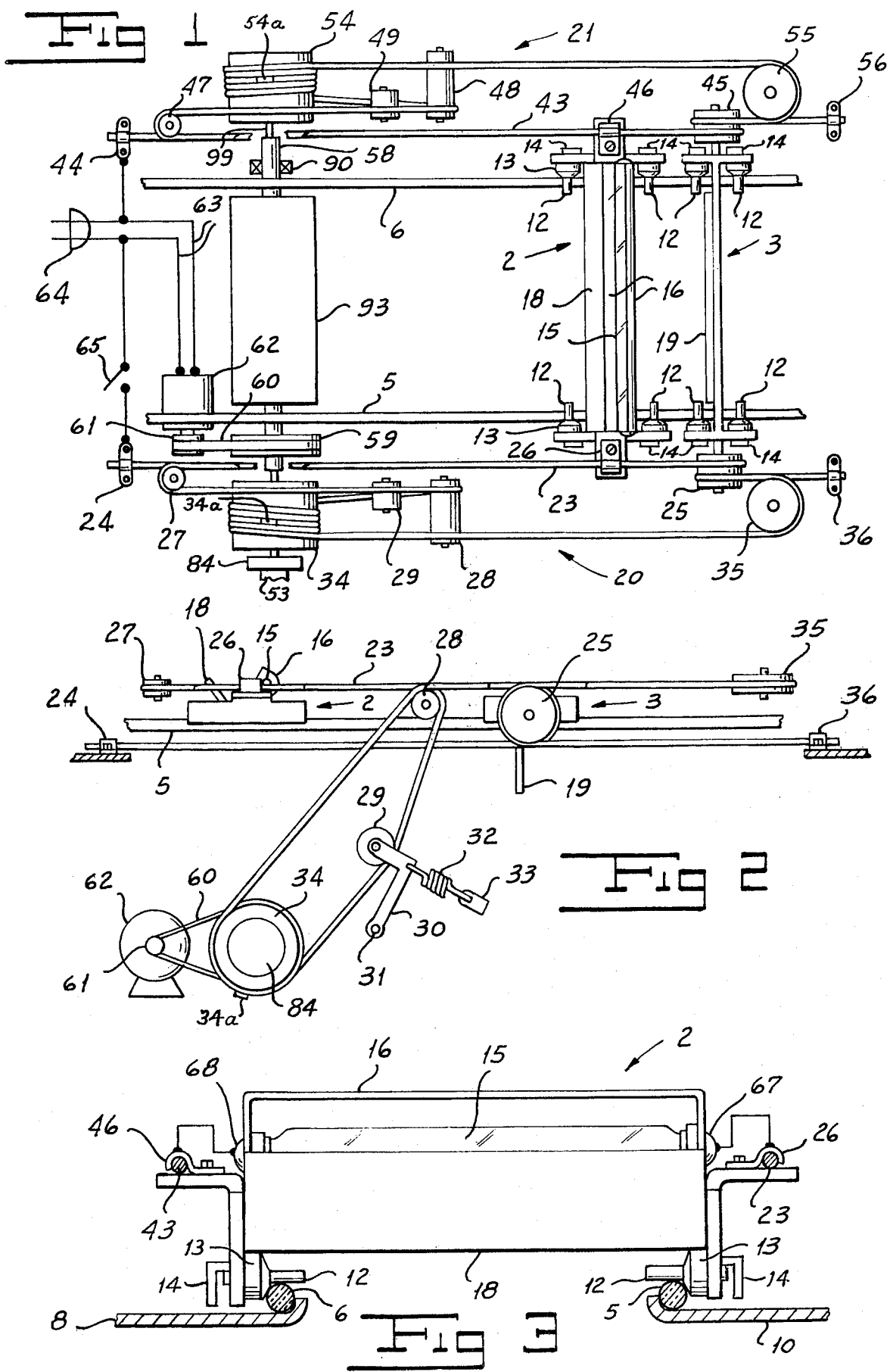

PHOTOCOPIER SCANNING APPARATUS

BACKGROUND OF THE INVENTION

In the prior art, scanning apparatus for electrophotographic copiers usually includes a full-rate carriage and a half-rate carriage. The full-rate carriage mounts a lamp and a mirror and moves along the length of a document illuminating successive portions of its surface. The half-rate carriage mounts a mirror and moves in the same direction as the full-rate carriage, but at one-half its speed. Light from the document is reflected by the full-rate mirror to the half-rate mirror and thence to a lens. The lens focuses the light upon a revolving photoconductive drum, producing a latent image from which a photocopy is made. The motion of the half-rate carriage relative to the full-rate carriage maintains a constant object distance from the lens so that the image on the photoconductive drum is always in focus.

These carriages are mounted on two parallel guides and are driven by a single cable, attached to the full-rate carriage and engaging a pulley mounted on the half-rate carriage. The cable and the pulley are mounted on one side of the carriages, adjacent one of the guides, to avoid obstructing the light path from document to lens. Since the cable and pulley do not act through the centers of gravity of the carriages, appreciable moments are applied to the carriages, tending to cock them. To resist cocking, each carriage is provided with guide bearings having a large spacing along at least one of the guides, increasing the length and weight of the carriages. The carriages must have a rigid and hence massive structure to resist distortion under the assymmetrical driving forces. Acceleration of the carriages, at the beginning and end of a scan produces large frictional forces in the guide bearings which tend to cause chattering.

Also in the prior art, the illuminating lamp mounted on the full-rate carriage is energized through sliding electrical contacts. Such sliding contacts produce friction and are subject to wear.

SUMMARY OF THE INVENTION

One object of my invention is to provide an electrophotographic copier having lightweight scanning carriages and permitting high speed operation.

Another object of my invention is to provide an electrophotographic copier wherein the full-rate carriage is driven by a pair of cables disposed on either side of its center of gravity.

Still another object of my invention is to provide an electrophotographic copier wherein the half-rate carriage is driven by a pair of cables engaging pulleys mounted on either side of its center of gravity.

A further object of my invention is to provide an electrophotographic copier wherein the half-rate carriage is directly driven by a cable secured thereto.

A further object of my invention is to provide an electrophotographic copier wherein the half-rate carriage is directly driven by a pair of cables secured thereto on either side of its center of gravity.

A still further object of my invention is to provide an electrophotographic copier wherein the illuminating lamp mounted on the full-rate carriage is electrically energized through a pair of conductive drive cables mechanically secured thereto.

Other and further objects of my invention will appear from the following description.

In general, my invention contemplates a photocopier scanning apparatus in which the opposite sides of each scanning carriage are synchronously driven by two parallel cable systems. The cables may be conductive to couple electrical energy to the illuminating lamp mounted on the full-rate carriage.

The cable systems act on the carriages on either side of their centers of gravity, so that no rotational forces are applied to the carriages upon acceleration. The carriages may have a relatively small length and be of relatively light construction. Since the carriages do not tend to cock, the frictional forces on the guides are relatively low. The conductive cable systems eliminate friction in sliding electrical contacts and are not subject to wear.

BRIEF DESCRIPTION OF THE DRAWINGS

In the accompanying drawings which form part of the instant specification and which are to be read in conjunction therewith and in which like reference numerals are used to indicate like parts of the various views:

FIG. 1 is a plan view of a photocopier scanning mechanism illustrating one embodiment of my invention.

FIG. 2 is a side view of the embodiment of FIG. 1 with the carriages in different positions.

FIG. 3 is a front view showing the full-rate carriage of FIG. 1.

DESCRIPTION OF THE PREFERRED EMBODIMENT

Figure 4:
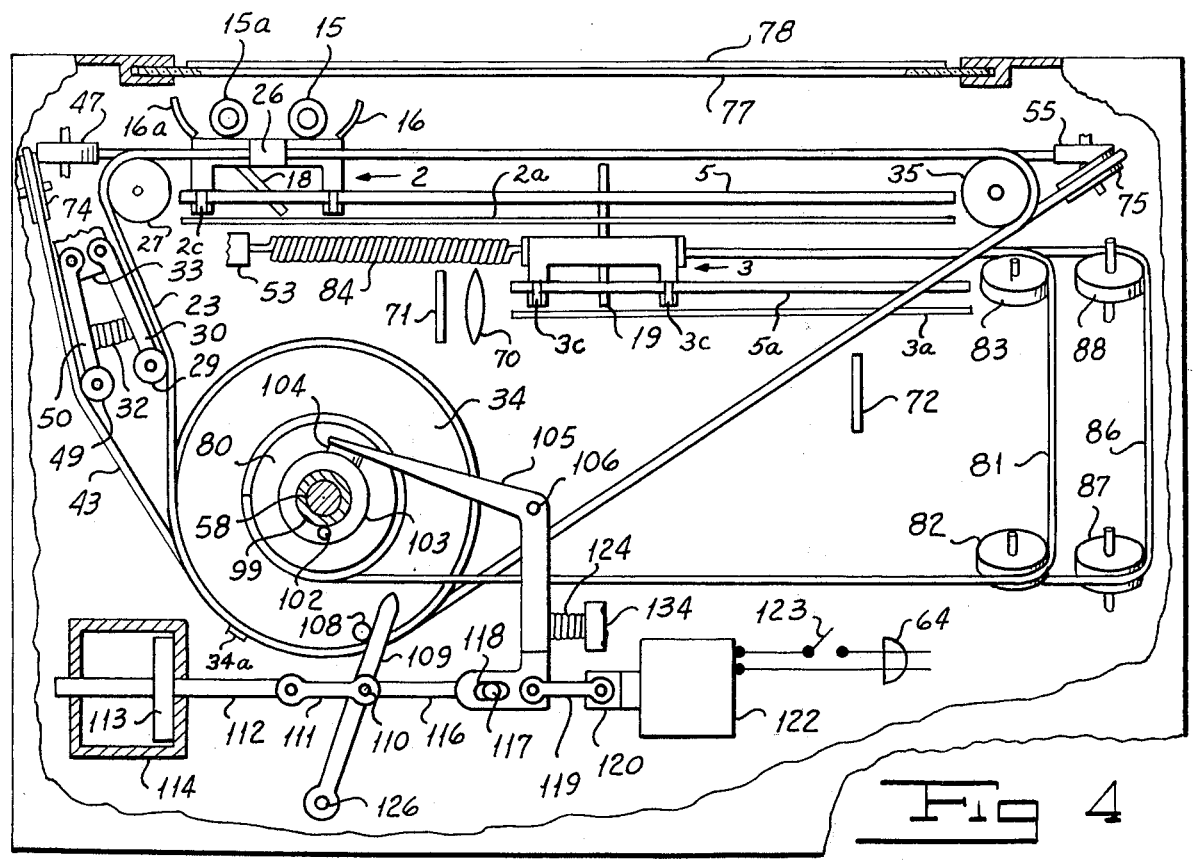
FIG. 4 is a side view showing a second embodiment of my invention.

Referring now to FIGS. 1 through 3 of the drawings, a full-rate carriage indicated generally by the reference numeral 2 and a half-rate carriage indicated generally by the reference numeral 3 are mounted upon two parallel slides 5 and 6. Slides 5 and 6 may comprise smooth polished glass rods, which, as shown in FIG. 3, are supported by respective flanges 10 and 8. Carriages 2 and 3 are mounted upon slides 5 and 6 by sliding bearings 12. Bearings 12 have portions 13 of larger diameter to restrict lateral motion of the carriages. To maintain bearings 12 in intimate contact with slides 5 and 6 despite the relatively low mass of the carriages, each carriage is provided with four hold down magnets 14, which couple magnetic flux into flanges 8 and 10, which should be formed of a permeable material.

Figure 5:
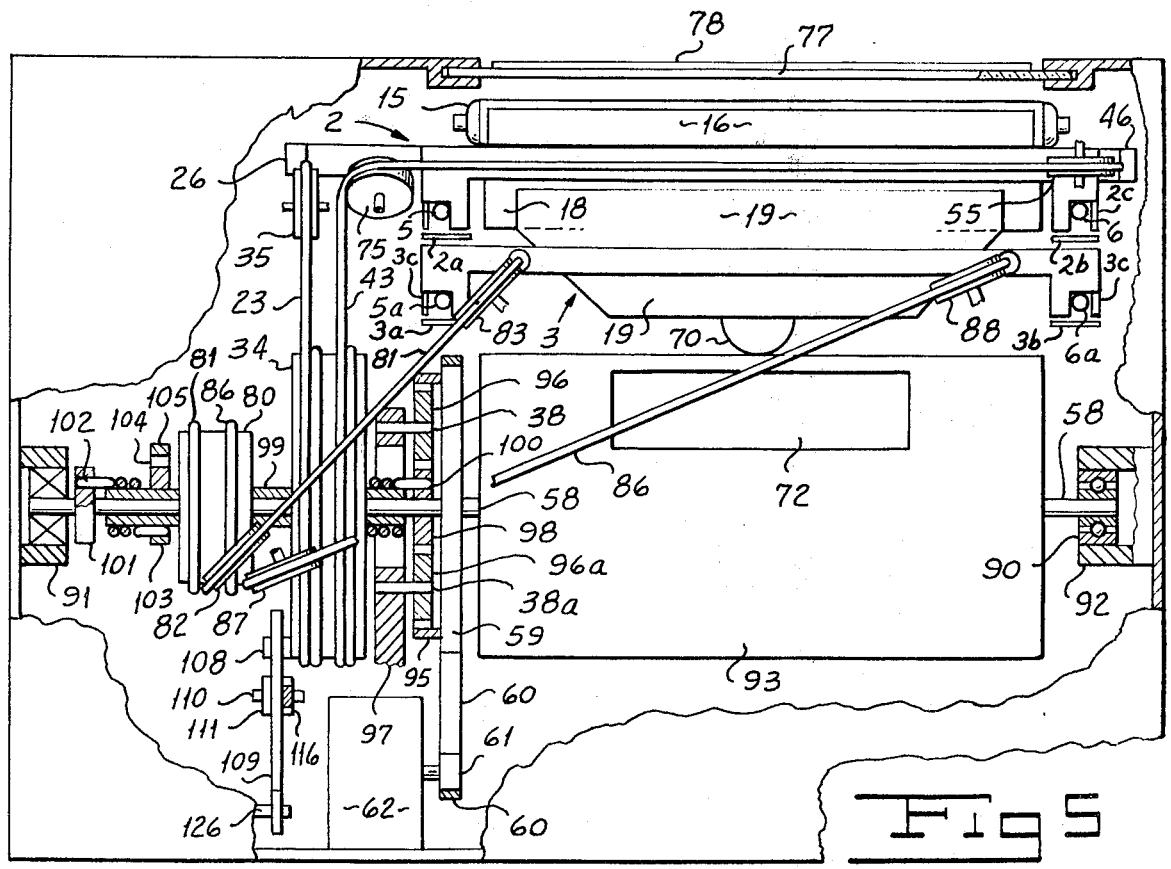
FIG. 5 is a front view of the embodiment of FIG. 4.

An illuminating lamp 15 is mounted on carriage 2 and provided with a reflector 16, which directs light from lamp 15 onto a portion of a document placed above carriage 2 (FIGS. 4 and 5). Light from the illuminated portion of the document is reflected from a scanning mirror 18, also mounted on carriage 2, to a mirror 19 mounted on the half-rate carriage 3. Light reflected from mirror 19 is directed to a lens.

As shown in FIG. 4, a reflex lens may be used, which includes lens 70 and mirror 71. Light focused by reflex lens 70-71 is directed to a mirror 72 and thence to the photoconductive surface of a drum 93.

Referring again to FIGS. 1 through 3, the opposite sides of each carriage are driven by two parallel cable systems indicated generally by the reference numerals 20 and 21. Cable system 20 is shown in detail in FIG. 2.

A flexible conductive cable 23 is fixed at one end by a clamp 24. Cable 23 then passes half-way around one groove of a two groove sheave 25 rotatably mounted on carriage 3. Cable 23 then extends to clamp 26, which secures it to the full-rate carriage 2. Cable 23 then passes half-way around pulley 27 to an elongated pulley 28. Cable 23 then passes under a tensioning pulley 29 to a driving drum 34. Tensioning pulley 29 is mounted on a lever 30 pivotally supported on a shaft 31. Lever 30 is biased by a coil spring 32 toward a spring anchorage 33, which maintains cable 23 taut. Cable 23 is helically wrapped about drum 34. In order to prevent any slippage between cable 23 and drum 34, clamp 34a fixes one point of cable 23 to drum 34.

From drum 34, cable 23 extends over the elongated pulley 28 and then passes half-way around a further pulley 35. From pulley 35, cable 23 extends half-way around a second groove of sheave 25 to a clamp 36.

Cable system 21 is similar to cable system 20 and includes a flexible conductive cable 43, which is fixed at one end by clamp 44 and successively traverses one groove of sheave 45, clamp 46, pulley 47, elongated pulley 48, tensioning pulley 49, drum 54, clamp 54a, elongated pulley 48, pulley 55, and the second groove of sheave 45 to clamp 56. Clamp 46 secures cable 43 to the other side of carriage 2. Sheave 45 is rotatably mounted on the other side of carriage 3. Cable 43 is helically wrapped about drum 54; and clamp 54a prevents slippage therebetween.

A voltage source, such as a wall plug 64, has one conductor connected to clamp 44 and the other conductor connected through a switch 65 to clamp 24. Cables 23 and 43, as well as clamps 24, 44, 26, and 46 are conductive. All other elements contacting the cables 23 and 43 are formed of an insulating material or include insulating spacers to prevent any short circuits.

As may be seen by reference to FIG. 3, lamp 15 is energized from wall plug 64 through conductive cables 23 and 43. Lamp 15 is mounted in electrical sockets 67 and 68. Socket 67 is electrically connected to clamp 26; and socket 68 is electrically connected to clamp 46.

Wall plug 64 is also connected through conductors 63 to an electrical motor 62, which drives a pulley 61 having mounted thereon a belt 60, which engages a pulley 59 mounted on a hollow shaft 58 journalled in bearings such as 90. Shaft 58 mounts the photoconductive drum 93. Extending through the hollow shaft 58 is a shaft 99, which mounts the cable drive drums 34 and 54. Shaft 99 also extends into a housing 84, in which is mounted a spiral spring, the central or inner end of which is secured to shaft 99 and the peripheral or outer end of which is secured to housing 84. Spiral spring housing 84 is mounted on member 53.

In operation, the photoconductive drum is continuously driven by motor 62 through pulley 61, belt 60, pulley 59 and shaft 58. At the beginning of a scan, carriages 2 and 3 are in the positions shown in FIG. 2; and at the end of a scan, the carriages are in the positions shown in FIG. 1. Shaft 58 is selectively clutched to shaft 99 as shown in greater detail in FIGS. 4 and 5 to drive drum 34 counterclockwise in FIG. 2, thus causing both carriages to move to the right, and winding up the spiral spring in housing 84. At the end of a scan, shaft 99 is declutched from shaft 58; and the spiral spring in housing 84 unwinds, thus returning the carriages to the positions shown in FIG. 2. During the course of the forward scan, switch 65 is closed to energize lamp 15; and at the end of a scan, switch 65 is opened to extinguish lamp 15.

Referring now to FIGS. 4 and 5, a document 78 to be copied is placed upon a transparent glass plate 77, and illuminated by lamps 15 and 15a mounted on the full-rate carriage 2. Reflectors 16 and 16a assist in concentrating the light from lamps 15 and 15a upon the region to be illuminated. The full-rate mirror 18 reflects light from the illuminated portion of document 78 to half-rate mirror 19 mounted on the half-rate carriage 3. Light reflected from half-rate mirror 19 passes to a reflex lens including lens 70 and mirror 71. Light from the reflex lens 70-71 is reflected from mirror 72 and focused upon the photoconductive surface of drum 93. Carriage 2 rests upon parallel spaced slides 5 and 6; carriage 3 rests upon parallel spaced slides 5a and 6a. Each of the carriages is provided with four depending legs, which prevent lateral motion of the carriages. These legs are formed of a permeable material. Disposed below slides 5 and 6 are respective members 2a and 2b formed of a permeable material. Disposed below slides 5a and 6a are respective members 3a and 3b formed of a permeable material. Carriage 2 is provided with four hold down magnets 2c, which couple flux into members 2a and 2b and is returned through the permeable depending legs of carriage 2. Carriage 3 is also provided with four hold down magnets 3c, which couple flux into the members 3a and 3b and is returned through the permeable depending legs of carriage 3.

The full-rate carriage is driven by drum 34, which mounts two cables 23 and 43. Cable 23 extends from drum 34 around pulley 35 to a clamp 26 mounted on the near side of carriage 2. From clamp 26, cable 23 extends around pulley 27 and then over tensioning pulley 29 back to drum 34. Cable 23 is helically wrapped about drum 34 and is secured thereto at one point by clamp 34a. Cable 43 extends from drum 34 to a pulley 75 and thence to a pulley 55. From pulley 55, cable 43 passes to clamp 46 mounted on the remote side of carriage 2. From clamp 46, cable 43 passes around pulley 47 and thence to pulley 74. From pulley 74, cable 43 passes under tensioning pulley 49 back to drum 34. Cable 43 is helically wrapped about drum 34 and is secured thereto at one point by a clamp. Tensioning pulleys 29 and 49 are rotatably mounted on respective arms 30 and 50, each pivotally mounted on a member 33. Arms 30 and 50 are biased away from one another by a spring 32 to maintain tension in each of cables 23 and 43.

The photoconductive drum 93 is mounted on shaft 58 which is supported by bearings such as 90 mounted in respective members 92 and 91. Drive motor 62 rotates pulley 61 which through belt 60 drives a large pulley 59 mounted on the shaft 58. Pulley 59 mounts a ring gear 95 which drives planetary pinions 96 and 96a. Pinions 96 and 96a are journalled on respective shafts 38 and 38a mounted in member 97. These planetary pinions drive a sun gear 98, which is journalled on shaft 58. Rotatably mounted on shaft 58 is a hollow shaft 99, which mounts drum 34 and a further drum 80. The diameter of drum 80 is substantially half that of drum 34. A helical spring 100 is tightly wrapped about shaft 99; and one end of spring 100 is mounted in sun gear 98. A further helical spring 102 is loosely wrapped about shaft 99. One end of spring 102 is mounted in a member 101, which is fixed to shaft 58. The other end of spring 102 is mounted in a ring member 103, which is journalled on shaft 99.

Mounted on and secured to drum 80 are spaced cables 81 and 86. Cable 81 extends from drum 80 under pulley 82 and over pulley 83 to one side of half-rate carriage 3. Cable 86 extends under pulley 87 and over pulley 88 to the other side of carriage 3.

Ring 103 may be selectively engaged by a friction clutch 104 mounted on a lever 105 journalled on shaft 106. Clutch 104 is normally biased to disengage ring 103 by a spring 124, mounted on support 134, which bears against a depending arm of lever 105. The depending arm of lever 105 is connected by link 119 to the plunger 120 of a solenoid 122, which is selectively energized from wall plug 64 through switch 123. The depending arm of lever 105 is provided with a slightly elongated slot 118 in which rides a pin 117 secured to a link 116 pivotally mounted on a stub shaft 110. Stub shaft 110 is mounted in a member 109, which pivots on shaft 126. Also journalled on stub shaft 110 is a link 111, which couples member 109 to the output shaft 112 of an air damper piston 113 within cylinder 114. The free end of member 109 may be engaged by a pin 108, mounted in the side of drum 34 adjacent its periphery. Secured to the rear of carriage 3 are a pair of spaced coil springs, such as spring 84, which are attached to a member 53. Springs 84 move carriage 3 to the left in FIG. 4 and hence cause drums 80 and 34 to rotate counterclockwise. This also returns carriage 2 to the position shown in FIG. 4 at the beginning of a scan.

In the return position shown in FIG. 4, pin 108 is biased by springs 84 against lever 109; and piston 113 bears against cylinder 114, preventing further counterclockwise rotation of drum 34. The photoconductive drum 93 normally rotates clockwise in FIG. 4; and the near surface of drum 93 in FIG. 5 moves downwardly. To begin a scan, switch 123 is closed energizing solenoid 122. Plunger 120 is pulled to the right thereby rotating lever 105 counterclockwise until clutch 104 engages ring 103. Helical spring 102 is wound on shaft 99 with a slight clearance, so that ring 103 normally rotates synchronously with shaft 58 and drum 93. When clutch 104 engages ring 103, spring 102 wraps itself tightly about shaft 99, thus clutching shaft 99 to member 101 and shaft 58. Drums 80 and 34 now rotate clockwise in FIG. 4 driving carriages 2 and 3 to the right, the motion of carriage 2 being twice that of carriage 3. After drum 34 has rotated slightly less than one revolution from the position shown in FIG. 4, pin 108 engages the right-hand side of lever 109. Upon further clockwise rotation of drum 34, pin 109 moves the tip of lever 109 to the left. Link 116 also moves to the left until pin 117 abuts the left-hand edge of lost motion slot 118. Further, clockwise movement of drum 34 causes pin 117 to rotate lever 105 clockwise and disengage clutch 104 against the action of solenoid 122. Spring 102 unwinds, declutching shaft 99 from shaft 58. The inertia of the rapidly moving parts will cause further clockwise movement of drum 34 against the action of return springs 84. As lever 109 rotates counterclockwise, piston 113 is moved to the left within damper cylinder 114, dissipating the kinetic energy stored in the moving parts during the forward scan. Drum 34 normally comes momentarily to rest long before piston 113 reaches its full stroke and touches the left-hand wall of cylinder 114. At some point during this interval, switch 123 is opened to disable solenoid 122. Drum 34 now begins to accelerate counterclockwise under the force of return springs 84.

The diameter of ring gear 95 is approximately three times that of sun gear 98. Accordingly, sun gear 98 rotates in a direction opposite to that of shaft 58 at approximately three times its speed. Spring clutch 100 is tightly wound on shaft 99 and functions as a one-way clutch, which is disengaged when shaft 99 is at rest or moving in the same direction as shaft 58 during the course of a forward scan. Shaft 99 accelerates in the reverse direction under the force of return springs 84 until its speed becomes equal to that of sun gear 98. At this point, clutch 100 engages to prevent the reverse velocity of shaft 99 from exceeding three times the forward velocity of shaft 58. As the carriages 2 and 3 approach the home position, pin 108 engages the left-hand edge of lever 109 with piston 113 disposed perhaps adjacent the center of cylinder 114. Further, counterclockwise movement of drum 34 acts through pin 108 and lever 109 to move piston 113 to the right, thus compressing air trapped between the right-hand face of piston 113 and cylinder 114. This compressed air escapes through an annular leakage orifice and thus introduces a high degree of damping. As piston 13 approaches the position shown, the compression space approaches zero; and the retarding and damping forces become extremely high. The system is brought to a substantial rest slightly before piston 113 engages cylinder 114, while there is still a small but measurable clearance volume of compressed air. The air compressed rapidly leaks from the small clearance volume; and under the biasing force of return springs 84, drum 34 rotates slowly counterclockwise through a very small residual distance until piston 113 engages cylinder 114 and the clearance volume is reduced to zero. If the annular orifice between piston 113 and cylinder 114 is too small, the air spring effect will exceed the damping effect, and the system will exhibit some rebound. If the annular damping orifice is too large, there will be insufficient air spring effect to bring the system to rest before piston 113 engages cylinder 114; and an adverse shock will result. The proper size orifice will bring the system to rest without substantial rebound slightly before piston 113 engages cylinder 114.

It will be seen that I have accomplished the objects of my invention. I have provided a photocopier scanner wherein a scanning carriage is driven by a pair of cables disposed on either side of its center of gravity. The carriages are of relatively short length and low mass; and high speed operation is achieved without cocking of the carriages and without significant friction in the guide bearings under high acceleration. The illuminating lamp or lamps mounted on the full-rate carriage are supplied with electricity by the pair of flexible conductive cables to obviate friction and intermittent conduction through sliding electrical contacts. The half-rate carriage is driven by a pair of cable pulleys journalled on either side of its center of gravity. In an alternate embodiment, the half-rate carriage is directly driven by one or more cables secured thereto.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Photocopier scanning apparatus including in combination a scanning carriage having a center of gravity, an illuminating lamp mounted on the carriage, a pair of parallel and widely spaced guides disposed in a horizontal plane, said carriage resting on said guides, a pair of elongated magnetically permeable members, each member being disposed below the carriage and parallel to a corresponding guide, means including a pair of permanent magnets mounted on the carriage for coupling magnetic flux into each member, a pair of flexible and electrically conductive cables secured to the carriage at widely spaced points on either side of its center of gravity, means including said cables for driving the carriage a relatively large distance from an initial position to a second position, means including said cables for electrically energizing the lamp, means including a spring for urging the carriage to return to said initial position, said drive means further including a clutch and a solenoid and means for electrically energizing the solenoid to engage the clutch, mechanical means operable at said second position for disengaging the clutch, means subsequently operable to de-energize the solenoid, means for limiting the return velocity of the carriage, and means operable a relatively short distance from said initial position for arresting the return velocity of the carriage.

2. Photocopier apparatus for scanning along a certain length including in combination a full-rate scanning carriage, a half-rate scanning carriage, each carriage having a center of gravity, a pair of cables, means securing the cables to the full-rate carriage at widely spaced points on either side of its center of gravity, a pair of pulleys journaled on the half-rate carriage at widely spaced locations on either side of its center of gravity, each one of said cables engaging a corresponding one of said pulleys, a guide, means including a first pair of bearings having a first relatively small longitudinal spacing for supporting the full-rate carriage on the guide, means including a second pair of bearings having a second relatively small longitudinal spacing for supporting the half-rate carriage on the guide; and means for synchronously moving said cables to drive both scanning carriages in the same direction along the guide, each of said first and second spacings being appreciably less than half said scanning length.

3. Photocopier scanning apparatus including in combination a full-rate scanning carriage, a half-rate scanning carriage, each carriage having a center of gravity, a first and a second cable drum, the second drum having a diameter substantially half that of the first drum, a pair of cables engaging the first drum and secured to the full-rate carriage at widely spaced points on either side of its center of gravity, a pair of flexible and relatively inextensible cables engaging the second drum and secured to the half-rate carriage at widely spaced points on either side of its center of gravity, and means for synchronously rotating the first and second drums to drive positively both scanning carriages in the same direction.

4. Photocopier scanning apparatus including in combination a scanning carriage, an illuminating lamp mounted on the carriage, means including a pair of flexible and electrically conductive cables for mechanically driving the carriage, and means including said conductive drive cables for electrically energizing the lamp.

5. Photocopier scanning apparatus including in combination a full-rate scanning carriage having a center of gravity, a half-rate scanning carriage, a first and a second cable drum, the second drum having a diameter substantially half that of the first drum, a pair of cables engaging the first drum and secured to the full-rate carriage at widely spaced points on either side of its center of gravity, a flexible and relatively inextensible cable engaging the second drum and secured to the half-rate carriage, and means for synchronously rotating the first and second drums to drive positively both scanning carriages in the same direction.

6. Photocopier scanning apparatus including in combination a scanning carriage, means for driving the carriage from an initial position, means including a spring for urging the carriage to return to said initial position, means for disengaging the drive means, and means including a unidirectional clutch for limiting the return velocity of the carriage.

7. Photocopier scanning apparatus including in combination a scanning carriage, means for driving the carriage a relatively large distance from an initial position, means including a spring for urging the carriage to return to said initial position, means for disengaging the drive means, means including a unidirectional clutch for limiting the return velocity of the carriage, and means operable at a relatively short distance from said initial position for arresting the return velocity of the carriage.

8. Photocopier scanning apparatus including in combination a scanning carriage, a pair of parallel and widely spaced guides disposed in a horizontal plane, said carriage resting on said guides and being urged thereagainst by gravity, a pair of elongated magnetically permeable members, each member being disposed below the carriage and parallel to a corresponding guide, and means including a pair of permanent magnets mounted on the carriage for coupling magnetic flux into each permeable member.

9. Photocopier scanning apparatus including in combination a scanning carriage, means for driving the carriage from an initial position to a second position, means including a spring for urging the carriage to return to said initial position, said drive means including a clutch and a solenoid and means for electrically energizing the solenoid to engage the clutch, mechanical means operable at said second position for disengaging the clutch, and means subsequently operable to de-energize the solenoid.

10. Photocopier scanning apparatus including in combination a scanning carriage, a pair of parallel and widely spaced slides disposed in a horizontal plane, said slides being formed of glass, said carriage resting on said slides and being urged thereagainst by gravity, and means including a pair of permanent magnets mounted on the carriage for increasing the force with which the carriage is urged against the slides.

11. Photocopier scanning apparatus including in combination a scanning carriage, a pair of parallel and widely spaced slides disposed in a horizontal plane, each slide comprising a glass rod having a smooth finished arcuate upper surface portion, and a pair of sliding bearings mounted on the carriage, each bearing contacting said surface portion of a corresponding slide.

12. Photocopier scanning apparatus including in combination a full-rate scanning carriage, a half-rate scanning carriage having a center of gravity, a first and a second cable drum, the second drum having a diameter substantially half that of the first drum, a cable engaging the first drum and secured to the full-rate carriage, a pair of flexible and relatively inextensible cables engaging the second drum and secured to the half-rate carriage at widely spaced points on either side of its center of gravity, and means for synchronously rotating the first and second drums to drive positively both scanning carriages in the same direction.

13. Photocopier scanning apparatus including in combination a full-rate scanning carriage, a half-rate scanning carriage, a first and a second cable drum, the second drum having a diameter substantially half that of the first drum, a first cable engaging the first drum and secured to the full-rate carriage, a flexible and relatively inextensible second cable engaging the second drum and secured to the half-rate carriage, means for synchronously rotating the first and second drums to drive positively both carriages in the same direction, and means for resiliently biasing the half-rate carriage in an opposite direction to tension said second cable.

14. Photocopier scanning apparatus including in combination a scanning carriage, a pair of parallel and widely spaced guides disposed in a horizontal plane, said carriage resting on said guides and being urged thereagainst by gravity, and means including a pair of permanent hold-down magnets mounted on the carriage for increasing the force with which the carriage is urged against the guides.

15. Photocopier scanning apparatus including in combination a scanning carriage, an illuminating lamp mounted on the carriage, means including a flexible and electrically conductive cable for mechanically driving the carriage, and means including said conductive drive cable for electrically energizing the lamp.

16. Photocopier scanning apparatus including in combination a scanning carriage having a center of gravity, a horizontal guide, means including a pair of bearings having a relatively small longitudinal spacing for supporting the carriage on the guide, a pair of cables secured to the carriage at widely spaced points on either side of its center of gravity, and means for synchronously moving said cables to drive the carriage along the guide, said widely spaced cables preventing cocking of the carriage about a vertical axis, said spacing of the bearings being appreciably less than that necessary to resist such cocking of the carriage.

* * * * *